United States Patent
Trinkenschuh

(12) 
(10) Patent No.: US 10,989,254 B2
(45) Date of Patent: Apr. 27, 2021

(54) CLUTCH SYSTEM

(71) Applicant: Schaeffler Technologies AG & Co. KG, Herzogenaurach (DE)

(72) Inventor: Andreas Trinkenschuh, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 200 days.

(21) Appl. No.: 16/083,962

(22) PCT Filed: Feb. 17, 2017

(86) PCT No.: PCT/DE2017/100126
§ 371 (c)(1),
(2) Date: Sep. 11, 2018

(87) PCT Pub. No.: WO2017/157372
PCT Pub. Date: Sep. 21, 2017

(65) Prior Publication Data
US 2020/0292011 A1 Sep. 17, 2020

(30) Foreign Application Priority Data
Apr. 14, 2016 (DE) .......................... 102016206249.2

(51) Int. Cl.
*F16D 21/08* (2006.01)
*B60K 6/387* (2007.10)
(Continued)

(52) U.S. Cl.
CPC .............. *F16D 21/08* (2013.01); *B60K 6/387* (2013.01); *B60K 17/02* (2013.01); *F16D 13/38* (2013.01);
(Continued)

(58) Field of Classification Search
CPC .......... F16D 21/08; F16D 13/38; F16D 23/12; F16D 2023/123; F16D 27/112;
(Continued)

(56) References Cited

U.S. PATENT DOCUMENTS 6,343,681 B1 * 2/2002 Aoki ....................... F16D 41/04
192/35
6,905,008 B2 * 6/2005 Kowalsky ............. F16D 27/115
192/35
(Continued)

FOREIGN PATENT DOCUMENTS

| CN | 1522345 A | 8/2004 |
|----|-----------|--------|
| CN | 104295632 A | 1/2015 |

(Continued)

*Primary Examiner* — Timothy Hannon
(74) *Attorney, Agent, or Firm* — Lekeisha Suggs

(57) ABSTRACT

A clutch system for coupling a drive shaft of a motor vehicle engine to a transmission input shaft of a motor vehicle transmission is disclosed. The clutch system includes a friction clutch for transmitting a torque between a torque-introducing element and a torque-discharging element. The system includes a ramp system for the axial displacement of a pressure plate of the friction clutch, wherein the ramp system has an input ramp and an output ramp, which can be turned in relation to the input ramp to change an axial extent of the ramp system. A pilot clutch for actuating the ramp system based on a differential speed between the torque-introducing element and the torque-discharging element is provided. The clutch system further includes an electromagnet for the magnetic actuation of the pilot clutch, wherein the pilot clutch is arranged between the friction clutch and the electromagnet in the axial direction and the ramp system is arranged radially on the inside in relation to the pilot clutch and/or in relation to the friction clutch.

16 Claims, 3 Drawing Sheets

(51) Int. Cl.
*B60K 17/02* (2006.01)
*F16D 13/38* (2006.01)
*F16D 23/12* (2006.01)
*F16D 27/112* (2006.01)

(52) U.S. Cl.
CPC ............ *F16D 23/12* (2013.01); *F16D 27/112* (2013.01); *F16D 2023/123* (2013.01)

(58) Field of Classification Search
CPC ...... F16D 27/115; F16D 27/108; F16D 27/14; B60K 6/387; B60K 17/02
See application file for complete search history.

(56) References Cited

U.S. PATENT DOCUMENTS

| | | | |
|---|---|---|---|
| 6,935,475 B2 | 8/2005 | Weilant | |
| 2004/0188212 A1* | 9/2004 | Weilant | F16D 27/115 192/35 |
| 2012/0116638 A1* | 5/2012 | Leising | F16D 27/14 701/67 |
| 2015/0122606 A1* | 5/2015 | Vogel | B60K 6/40 192/20 |
| 2015/0122607 A1* | 5/2015 | Vogel | F16D 27/08 192/35 |

FOREIGN PATENT DOCUMENTS

| | | |
|---|---|---|
| CN | 104379957 A | 2/2015 |
| DE | 10101407 C1 | 6/2002 |
| DE | 102010048830 A1 | 5/2011 |
| DE | 102015209791 A1 | 8/2016 |
| EP | 1178233 A2 | 2/2002 |
| EP | 1178233 A3 | 10/2003 |
| JP | 2005076699 A | 3/2005 |
| JP | 2015500965 A | 1/2015 |
| WO | 2013186102 A1 | 12/2013 |

* cited by examiner

CLUTCH SYSTEM

CROSS-REFERENCE TO RELATED APPLICATIONS

This application is the U.S. National Phase of PCT Appln. No. PCT/DE2017/100126 filed Feb. 17, 2017, which claims priority to DE 10 2016 204 289.0 filed Mar. 16, 2016 and DE 10 2016 206 249.2 filed Apr. 14, 2016, the entire disclosures of which are incorporated by reference herein.

TECHNICAL FIELD

The present disclosure relates to a clutch system, with the aid of which a drive shaft of a motor vehicle engine can be coupled to at least one transmission input shaft of a motor vehicle transmission, in particular in a hybrid motor vehicle.

BACKGROUND

DE 10 2010 048 830 A1 discloses a clutch system for coupling a crankshaft to a transmission input shaft in which a main clutch, designed as a friction clutch, can be actuated with the aid of a ramp system. For closing the main clutch, the ramp system can change its axial extent by an output ramp that can turn in relation to an input ramp, and thereby axially displace a pressure plate of the main clutch. As a result, a clutch disk that is coupled to the transmission input shaft can be frictionally pressed between the pressure plate and a counter plate of the main clutch. For actuating the ramp system, a pilot clutch designed as a friction clutch can be closed with the aid of a lever spring, whereby the input ramp of the ramp system is coupled to the transmission input shaft and can turn in relation to the output ramp, acting as the pressure plate of the friction clutch.

SUMMARY

The object of the present disclosure is to indicate measures which make possible a clutch system with an installation space suitable for an application in a hybrid motor vehicle.

More specifically, a clutch system is for coupling a drive shaft of a motor vehicle engine to at least one transmission input shaft of a motor vehicle transmission, with a friction clutch, in particular designed as a multiplate clutch, for transmitting a torque between a torque-introducing element, in particular a drive shaft of the motor vehicle engine, and a torque-discharging element, in particular a transmission input shaft of the motor vehicle transmission, a ramp system for the axial displacement of a pressure plate of the friction clutch, wherein the ramp system has an input ramp and an output ramp, which can be turned in relation to the input ramp to change an axial extent of the ramp system, a pilot clutch for actuating the ramp system on the basis of a differential speed between the torque-introducing element and the torque-discharging element, a tie rod coupled to the pilot clutch for actuating the pilot clutch by axial displacement and a fixed electromagnet for the magnetic axial displacement of the tie rod, wherein the pilot clutch is arranged between the friction clutch and the electromagnet in the axial direction and the ramp system is arranged at least largely radially on the inside in relation to the pilot clutch and/or in relation to the friction clutch.

In the regular traction mode, a torque flow can take place from the torque-introducing element to the torque-discharging element substantially via the friction clutch. As a result, a torque produced in a motor vehicle engine designed as an internal combustion engine can be transmitted to a transmission input shaft of a motor vehicle transmission in order to drive the motor vehicle. It is also possible to connect an electrical machine via an output part of the friction clutch or the torque-discharging element, and therefore, in a booster mode, the motor vehicle can be additionally driven by the electrical machine operated in motor mode. For purely electrical operation of the motor vehicle, with the internal combustion engine switched off, the friction clutch can be opened by the pilot clutch being opened by energizing the electromagnet. A torque flow between the torque-discharging element and the torque-introducing element is thereby interrupted, and therefore the drag torque of the internal combustion engine does not diminish the power introduced by the electrical machine. In an overrun mode, the electrical machine can be operated in generator mode and recover electrical energy, while the internal combustion engine and its drag torque re-main decoupled due to the open pilot clutch and the open friction clutch. When a greater braking power is desired, the energizing of the electromagnet can be interrupted, and therefore the closing pilot clutch closes the friction clutch and the internal combustion engine with its drag torque can act as an additional engine brake. With the friction clutch closed, is also possible to use the electrical machine to introduce a starting torque for starting the internal combustion engine. In order to change over between the individual operating modes, it is sufficient to decouple or couple the internal combustion engine by energizing the electromagnet or interrupting the energizing of the electromagnet. This makes use of the insight that the internal combustion engine should be coupled for a large part of the operating time, and therefore a normally-closed design is an energy-efficient design both for the pilot clutch and for the friction clutch. Since, with the aid of the fastening finger protruding through the supporting disk, the tie rod can be positioned particularly close to the electromagnet, it is additionally sufficient for a correspondingly lower amount of energy to be used to produce a sufficient magnetic force by the electromagnet by which the tie rod can be axially displaced, and consequently the pilot clutch can be actuated. For the changeover of operating modes, all that is required is to use the electromagnet and the tie rod of the pilot clutch positioned close to the electromagnet to briefly exploit an existing speed difference between the torque-introducing element and the torque-discharging element to actuate the friction clutch, thus allowing easy and efficient adaptation of torque transmission in a powertrain, in particular that of a hybrid motor vehicle, to different driving strategies, while using a low amount of energy.

The electromagnet, the pilot clutch and the friction clutch may be arranged one behind the other in the axial direction. The electromagnet, the pilot clutch and the friction clutch may in this case be respectively arranged next to one another, and therefore, when viewed in a radial direction, the pilot clutch is not covered by either the electromagnet or the friction clutch. As a result, radial installation space in particular can be saved. This makes use of the insight that, in the case of a hybrid application, when a rotor of an electrical machine is connected to the output side of the friction clutch, the rotor of the electrical machine is in any case intended to have the greatest possible extent in the axial direction, in order to be able to introduce a correspondingly high, purely electrically generated drive power into the powertrain of the motor vehicle. At the same time, the rotor requires radial installation space, and therefore an extent of the clutch system that is elongated in the axial direction but rather small in the radial direction is particularly advantageous for a hybrid application.

There is also radially within the friction clutch an installation space that is not required by the friction clutch for torque transmission, in particular if the friction clutch is designed as a multiplate clutch. The ramp system can be at least partially provided in this installation space. When viewed in a radial direction, the friction clutch may at least partially cover the ramp system. The ramp system may be at least partially nested in the interior of the friction clutch. The output ramp of the ramp system may thereby interact with a pressure plate, which extends radially out-ward from the output ramp and possibly, at least in a partial region, with a component in the axial direction into the region of the radius of friction linings of the friction clutch. In addition or as an alternative, the pilot clutch may be positioned sufficiently far out radially that the ramp system can be at least partially positioned radially on the inside in relation to the pilot clutch. When viewed in a radial direction, the pilot clutch may at least partially cover the ramp system. The arrangement of the ramp system at least largely radially on the inside in relation to the pilot clutch allows the pilot clutch to transmit a sufficiently great torque to close the pilot clutch on the greater radius with a smaller radial extent. As a result, the radial installation space requirement can be kept low. As a particular preference, the ramp system is provided in one part radially on the inside in relation to the pilot clutch and in another part radially on the inside in relation to the friction clutch, and therefore the ramp system can be positioned almost neutrally in terms of installation space in the clutch system. Since the electromagnet, the pilot clutch and the friction clutch are arranged one behind the other in the axial direction and the ramp system is positioned in free installation space within the pilot clutch and/or the friction clutch, the clutch system can have a small radial extent, which makes enough installation space available for a rotor of an electrical machine, and therefore a clutch system with an installation space that is suitable for application in a hybrid motor vehicle is made possible.

The pilot clutch and the friction clutch, together with the ramp system connected in between, can form a so-called booster clutch. In the closed state of the friction clutch, the torque-introducing element and the torque-discharging element have substantially the same speed in slip-free operation. In the open state of the friction clutch, the torque-introducing element and the torque-discharging element can rotate at different speeds, with the result that a speed difference arises between the torque-introducing element and the torque-discharging element. The torque flowing via the torque-introducing element and the friction clutch can flow at least partially via the at least partially closed pilot clutch, allowing torque transmission from the pilot clutch at least temporarily via the ramp system to the friction clutch in the closed state of the pilot clutch, thereby making it possible to reduce component loads. In particular, the pilot clutch brings about slip-free frictional engagement between the torque-introducing element and the torque-discharging element when the input ramp is turned in relation to the output ramp. By means of the slip-free frictional engagement, it is possible to produce in the pilot clutch a speed difference which can be used to turn the input ramp in relation to the output ramp. At the same time, it is also possible in the slipping mode to transmit a torque, which can be passed on to the ramp system in order to provide a correspondingly high contact force for a pressure plate of the friction clutch that can be displaced by the ramp system. If speed equalization between the torque-introducing element and the torque-discharging element has not yet occurred, the slipping pilot clutch can convert the speed difference into a relative rotation of the input ramp in relation to the output ramp by means of suitable coupling of the ramp system to the pilot clutch. It is thereby possible to change the axial extent of the ramp system on the basis of the speed difference within the pilot clutch and thus on the basis of the speed difference between the torque-introducing element and the torque-discharging element. By means of the changing extent of the ramp system, the pressure plate can be displaced in order to close the friction clutch, wherein a displacement force for displacing the pressure plate can be derived from the torque transmitted via the pilot clutch. Once the extent of the ramp system has changed to the extent that, for example, the pressure plate clamps a clutch disk and/or plates of a multiplate clutch, ending of the slipping mode is followed by synchronization of the speeds of the torque-introducing element and the torque-discharging element, with the result that there is no longer a speed difference. The ramp system can then stay in the position reached.

In the closed position of the friction clutch, the majority of the torque to be transmitted can take place via the friction pair(s) in the friction clutch, wherein a smaller proportion of the torque to be transmitted can be transmitted via the pilot clutch. As a result, it is possible to introduce a correspondingly high contact force into the friction clutch via the pilot clutch, thus enabling a correspondingly higher torque to be transmitted reliably and without slippage. Here, a force multiplication can be achieved through a suitable choice of ramp slope for the ramp system, thus making it possible to achieve an increased multiplied contact force with a low actuating force for the actuation of the pilot clutch. Moreover, some of the torque to be transmitted can be used to provide the contact force, and therefore the contact force can be supplied from an additional energy source. By virtue of the fact that the actuating force engages on the pressure plate only indirectly via the pilot clutch, force intensification and/or torque derivation from the torque to be transmitted can be achieved by means of the pilot clutch in order to close the friction clutch, and therefore the friction clutch can be closed frictionally using a significantly increased contact force, thereby allowing reliable closure of the friction clutch with low design complexity.

By means of the ramp slope of the ramps of the ramp system, force intensification can be achieved, with the result that the actuating force required to close the pilot clutch is significantly lower than the contact force which can be achieved at the pressure plate. As a result, the electromagnet can be of significantly smaller and more space-saving dimensions than if the electromagnet had to displace the pressure plate directly. It is furthermore possible to displace the pilot clutch out of the region of the pressure plate. The output ramp can be coupled to the torque-discharging element in a manner which prevents rotation but allows axial movement. As a result, the output ramp, which is coupled to the torque-discharging element, and the input ramp, which can be coupled to the torque-introducing element by means of the pilot clutch, can be turned in relation to one another when there is a differential speed between the torque-discharging element and the torque-introducing element. Alternatively, the output ramp may be coupled to the torque-introducing element in an axially displaceable but torque-transmitting manner, while the input ramp can be coupled to the output part of the friction clutch and/or the torque-discharging element for conjoint rotation, in particular by means of a clutch disk of the pilot clutch. The ramps of the ramp system can slide directly on one another or can be turned in relation to one another by way of at least one ball, a cylinder or some other rotatable element, thus enabling a ball-ramp system to be formed. By virtue of the turning of the ramps in relation to one another, the distance between the rear sides of the input ramp and output ramp facing away from the other, opposite ramp in each case can change, allowing the axial extent of the ramp system to decrease or increase accordingly. As a particular preference, the maximum relative turning angle of the input ramp in relation to the output ramp is for example limited by at least one stop, thereby, for example, making it possible to avoid exceeding a maximum range of wear for friction linings of the friction clutch.

In a preferred embodiment, on the output side or on the input side the friction clutch is mounted radially on the inside by means of a radially extending supporting disk, wherein the supporting disk has an axial outer side facing away from the friction clutch, wherein the tie rod is coupled to the pilot clutch by way of a fastening finger extending through the supporting disk and the tie rod is arranged between the electromagnet and the outer side of the supporting disk. The friction clutch can be supported by means of the supporting disk in a way that tilting is substantially prevented, while at the same time the magnetic actuation of the pilot clutch is ensured by the fastening finger passed through the supporting disk. This allows the tie rod to be positioned close to the electromagnet, and therefore the tie rod can be displaced while using a low amount of energy. Magnetic shielding of the tie rod is avoided by the supporting disk. In particular, the electromagnet can be positioned as far as possible out of the interior of the clutch system. This facilitates the connection and electrical contacting of the fixed electromagnet in relation to the other rotating components of the clutch system. The fastening finger has in particular a retaining groove running in the circumferential direction. A circlip, which serves as an axial stop for the tie rod, may be inserted into the retaining groove, and therefore, when the tie rod is magnetically attracted by the electromagnet, the tie rod automatically takes the fastening finger along with it. Alternatively, the tie rod itself may be captively held in the axial direction in the retaining groove, and therefore the axial displacement of the tie rod can correlate with an axial displacement of the fastening finger and of a pressure plate of the pilot clutch that is coupled to the fastening finger. The tie rod may have a clearance corresponding to the fastening finger, and therefore the tie rod can be inserted into the retaining groove by an axial relative movement and a subsequent relative rotation. A se-curing element that blocks relative rotation after the insertion of the tie rod into the retaining groove is preferably provided.

In particular, a fixed module carrier, holding the electromagnet, is provided, wherein the supporting disk is mounted on the module carrier, wherein in particular the module carrier has a disk part extending in the radial direction for the fastening of the electromagnet and an axially extending tube part for the mounting of the supporting disk. The module carrier may be fitted in the motor vehicle fixedly in terms of movement, and as a result support radial forces introduced via the supporting disk and/or axial forces of the friction clutch without requiring the torque-introducing element to bear any load. In particular, the supporting disk is mounted on the module carrier by way of a grooved ball bearing. At the same time, the electromagnet may be fastened on the module carrier, and therefore electrical lines for operating the electromagnet can be easily laid along the module carrier. Co-rotating electrical contacting is avoided.

The supporting disk preferably has a partly annular through-opening for passing the fastening finger through, wherein the extent of the through-opening in the circumferential direction corresponds at least to the sum of the extent of the fastening finger in the circumferential direction and the maximum relative rotation of the supporting disk in relation to the pilot clutch, in particular in relation to a pressure element connected to the fastening finger, during the actuation of the pilot clutch. Striking and/or jamming of the fastening finger in the through-opening can be avoided by making allowance for possible relative rotations in the dimensioning of the through-opening, in particular also with allowance for maximum wear of the friction linings in the pilot clutch, and also production tolerances and positional tolerances.

As a particular preference, provided between the electromagnet and the tie rod in the axial direction is a contact plate, which is mounted and fixed in the axial direction, for axially striking against the tie rod when there is a magnetic force acting from the electromagnet on the tie rod. Direct contact of the co-rotating tie rod with the fixed electromagnetic is thereby avoided, and therefore unnecessary friction by contact surfaces moving in relation to one another is avoided. The contact plate is for example mounted on the module carrier by means of a bearing designed for example as a ball bearing or sliding bearing. Due to its blocking function, the contact plate only needs to prevent striking against the electromagnet and, as result, can have a considerably smaller material thickness in comparison with the supporting disk. As a result, shielding of the magnetic force produced by the electromagnet by the contact plate can be kept low. The contact plate is preferably produced from a magnetically soft or ferromagnetic material and, as a result, can positively influence the magnetic field of the electromagnet. In particular, the contact plate is mounted on the module carrier. As a result, the axial distance of the contact plate from the electromagnet can be set exactly and, because of the short tolerance chain, set to a particularly small distance.

In particular, when viewed in the axial direction, the electromagnet and the tie rod overlap in a radial direction in an overlapping region $\Delta r$, where for the overlapping region $\Delta r$ with respect to an outer radius R of the friction clutch $0.05 \leq \Delta r/R \leq 0.90$, in particular $0.15 \leq \Delta r/R \leq 0.60$, preferably $0.20 \leq \Delta r/R \leq 0.50$ and as a particular preference $0.25 \leq \Delta r/R \leq 0.40$. By virtue of the positioning of the tie rod on the outer side of the supporting disk, there remains a comparatively great amount of installation space in the radial direction that can be used by the tie rod and the electromagnet. For this purpose, the tie rod is designed in particular substantially in the form of a disk, and therefore the tie rod has facing the electromagnet a comparatively large axial area, which is for example 50% to 99%, in particular 60% to 95% and preferably 70% to 90% of the outer side of the supporting disk. The comparatively large overlapping region allows a correspondingly high magnetic force to be exerted by the electromagnet on the tie rod without any great structural complexity. This makes it possible for example for the pilot clutch to provide a great reserve of wear, since the tie rod can still be displaced by the magnetic force of the electromagnet even when there is maximum wear of the friction linings.

Preferably, a closing spring, designed in particular as a leaf spring, is provided for automatically closing the pilot clutch when the electromagnet is switched off, wherein the closing spring is in particular fastened to an inner side of the supporting disk that is facing away from the outer side of the supporting disk. As a result, the electromagnet need only be actuated when the pilot clutch and the friction clutch are to be opened in order to disengage the internal combustion engine from the powertrain.

As a particular preference, it is provided that the output ramp is coupled to the torque-introducing element and the input ramp can be coupled to the torque-discharging element by way of the pilot clutch, or the output ramp is coupled to the torque-discharging element and the input ramp can be coupled to the torque-introducing element by way of the pilot clutch. It can in this way be ensured that the input ramp and the output ramp can be turned relatively in relation to one another on the basis of a speed difference between the torque-discharging element and the torque-introducing element. This also means that, after a synchronization of the speeds of the torque-discharging element to the torque-discharging element on the basis of the closed friction clutch, there is no longer a speed difference and the ramp system automatically stays in the relative position reached. Unintentional turning back of the ramp system can in this way be blocked.

Preferably, a restoring spring, designed in particular as a leaf spring, is provided for automatically opening the friction clutch, wherein the restoring spring acts in particular on the ramp system. If no contact force for closing the friction clutch is introduced into the friction clutch by the pilot clutch, the restoring spring can automatically open the friction clutch. As a result, the restoring spring can also act directly or indirectly on the ramp system and move the ramp system back into a position in particular with a smaller axial extent.

As a particular preference, a rotor of an electrical machine is connected to an output part of the friction clutch and/or to the torque-discharging element. As a result, the clutch system can be easily used as a hybrid module for a hybrid motor vehicle, in order to exchange power between the electrical machine and the torque-discharging element. The rotor has in particular permanent magnets, which can interact with electromagnets of a stator of the electrical machine, in order to realize a motor mode and a generator mode depending on the desired operating mode.

In particular, an output part of the friction clutch and/or the torque-discharging element has an integrated radial offset compensator, in particular a torque sensor. As a result, the opening and closing of the friction clutch by a speed difference present at the pilot clutch can take place more smoothly. Moreover, a relative rotation of involved component parts of the pilot clutch and of the friction clutch that occurs for actuation of the friction clutch can be automatically compensated. In particular, a spring element can be preloaded by the torque acting in the radial offset compensator during the closure of the friction clutch, with the result that the preloaded spring element can automatically open the friction clutch when the applied torque is no longer present. A changeover between overrun mode and traction mode can thereby be achieved in a simple manner, without the need for the action of an external control on the friction clutch or the pilot clutch.

The present disclosure also relates to a powertrain for a motor vehicle with a torque-introducing element, in particular a drive shaft of the motor vehicle engine, a torque-discharging element, in particular a transmission input shaft of the motor vehicle transmission, a clutch system, which can be embodied and refined as described above, for transmitting a torque between the torque-introducing element and the torque-discharging element, and an electrical machine for transmitting a torque between the electrical machine and the torque-discharging element. For the changeover of operating modes in overrun operation, all that is required is to use the pilot clutch to briefly exploit an existing speed difference between the torque-introducing element and the torque-discharging element to actuate the friction clutch, thus allowing easy and efficient adaptation of torque transmission in a powertrain of a hybrid motor vehicle to different driving strategies, in particular if the hybrid motor vehicle is to be driven purely electrically by the electrical machine. Since the electromagnet, the pilot clutch and the friction clutch are arranged one behind the other in the axial direction and the ramp system is positioned in free installation space within the pilot clutch and/or the friction clutch, the clutch system can have a small radial extent, which makes enough installation space available for a rotor of an electrical machine, and therefore a clutch system with an installation space that is suitable for application in a hybrid motor vehicle is made possible.

BRIEF DESCRIPTION OF THE DRAWINGS

The present disclosure is explained below with reference to the accompanying drawings on the basis of preferred exemplary embodiments by way of example, the features that are presented below each being able to represent an aspect of the present disclosure individually or in combination. In the figures.

DETAILED DESCRIPTION

Figure 1:
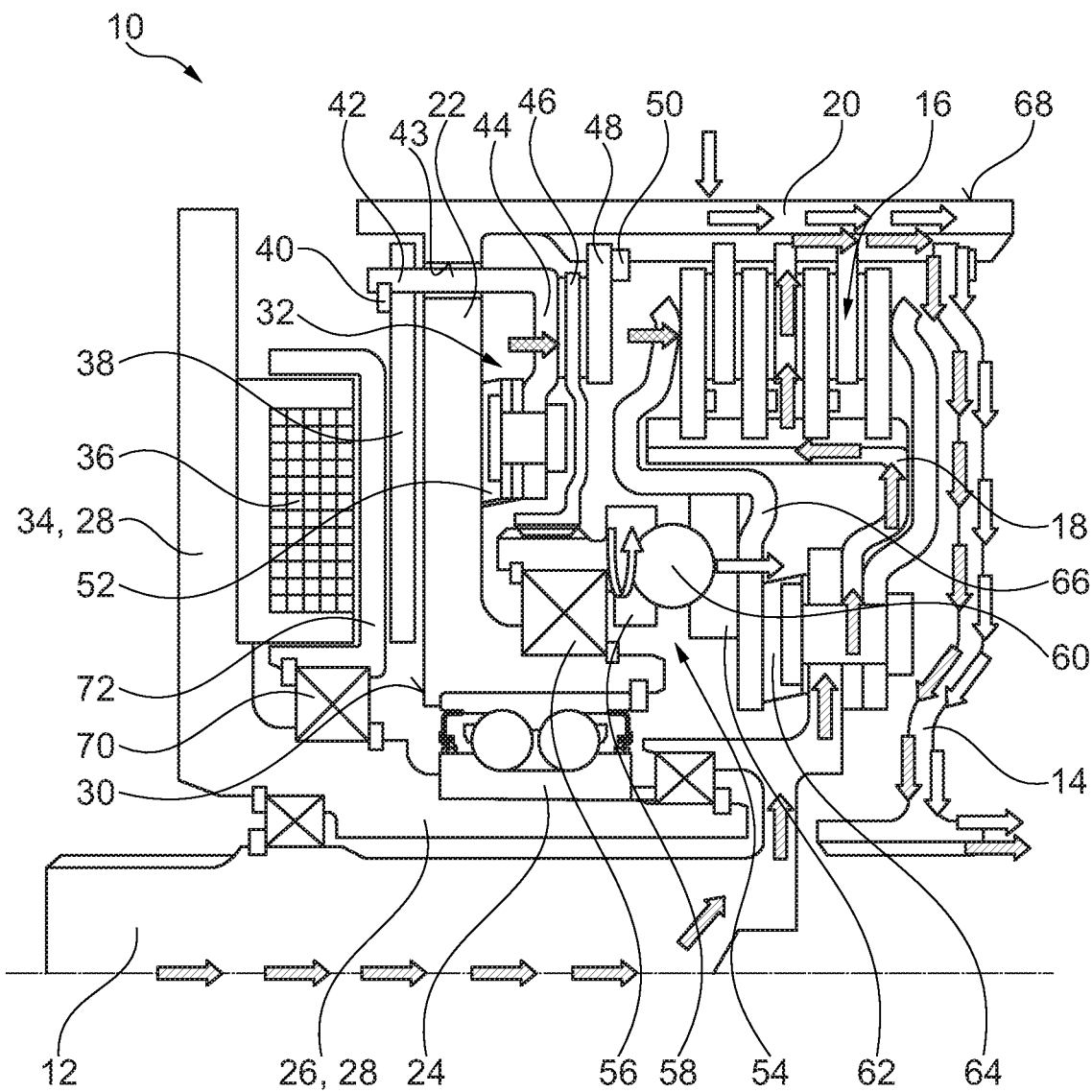
FIG. 1: shows a schematic sectional view of a clutch system in the closed state.

The clutch system 10 represented in FIG. 1 has a torque-introducing element 12, which is designed as a drive shaft of a motor vehicle and can be coupled to a torque-discharging element 14. The torque-discharging element 14 may be connected to a transmission input shaft of a motor vehicle transmission for conjoint rotation by means of a spline-type toothing. The coupling of the torque-introducing element 12 to the torque-discharging element 14 takes place by means of a friction clutch 16 designed as a multiplate clutch. The friction clutch 16 has an input part 18 designed as an inner plate carrier, which is connected to the torque-introducing element 12 for example in a torque-transmitting manner by means of a riveted connection. The input part 18 may interact with an output part 20, designed as an outer plate carrier, via friction pairings connected in between, in order in the closed state of the friction clutch 16 to exchange a torque between the torque-introducing element 12 and the torque-discharging element 14 or in the open state of the friction clutch 16 to interrupt a torque transmission between the torque-introducing element 12 and the torque-discharging element 14. The torque-discharging element 14 may be connected to the output part 20 in a torque-transmitting manner for example by way of a toothing. The output part 20 has a radially inwardly extending supporting disk 22, which is mounted rotatably on an axially extending tube part 26 of a fixed module carrier 28 by way of a grooved ball bearing 24 for supporting radial and axial loads. The supporting disk 22 has an axial outer side 30 facing away from the friction clutch 16.

For actuating the friction clutch 16, a pilot clutch 32 is provided, which can option-ally be actuated with the aid of an electromagnet 36 fastened fixedly in terms of movement on a disk part 34 of the module carrier 28 that extends in a radial direction. When the electromagnet 36 is energized, in order to open the pilot clutch 32 and consequently the friction clutch 16, the electromagnet 36 can magnetically attract an at least partially ferromagnetic tie rod 38, which is arranged between the electromagnet 36 and the outer side 30 of the supporting disk 22 in the axial direction. The tie rod 38 is fastened with the aid of a circlip 40 to a fastening finger 42 of the pilot clutch 32. Here, the fastening finger 42 is passed through a through-opening 43 of the supporting disk 22 that extends in the circumferential direction in the form of a slot. The fastening finger 42 is connected in one piece to a pressure element 44, with the aid of which a clutch disk element 46 can be frictionally clamped between the pressure element 44 and a counter element 48 connected to the output part 20 of the friction clutch 16 for conjoint rotation to close the pilot clutch 32. The counter element 48 is secured in the axial direction with the aid of a blocking element 50, in order to be able to support the force that is introduced by the pressure element 44 on the output part 20. In the exemplary embodiment represented, the pilot clutch 32 is designed as a single-disk friction clutch. The pressure element 44 is coupled to the supporting disk 22 by means of a closing spring 52 designed as a leaf spring, and therefore the pilot clutch 32 can be closed automatically by the closing spring 52 ("normally closed") when no magnetic force applied by the electromagnet 36 is acting on the tie rod 38.

The clutch disk element 46 can be used to actuate a ramp system 54. For this purpose, the clutch disk element 46 may for example act via a spline-type toothing on an input ramp 58 of the ramp system 54 that is mounted on the supporting disk 22 by means of a supporting bearing 56, with the result that, in the closed state of the pilot clutch 32, the input ramp 58 rotates at the speed of the output part 20 of the friction clutch 16, and consequently at the speed of the torque-discharging element 14. The input ramp 58 interacts with an output ramp 62 via a ball 60. The output ramp 62 is connected via a restoring spring 64, designed as a leaf spring, to the input part 18 of the friction clutch 16, and consequently to the torque-introducing element 12, with the result that the output ramp 62 rotates at the speed of the input part 18 and of the torque-introducing element 12. In the open state of the friction clutch 16, there is a speed difference between the torque-introducing element 12 and the torque-discharging element 14. With the pilot clutch 32 open, the input ramp 56 mounted rotatably by means of the supporting bearing 56 can rotate along with and at the speed of the output ramp 62, and therefore there is no relative rotation of the input ramp 58 in relation to the output ramp 62. With the pilot clutch 32 closed, a speed difference corresponding to the speed difference of the torque-introducing element 12 in relation to the torque-discharging element 14 occurs between the input ramp 58 and the output ramp 62, and therefore the input ramp 58 can turn in relation to the output ramp 62. As a result, the axial extent of the ramp system 54 can increase, and therefore a pressure plate 66 of the friction clutch 16 that is coupled to the output ramp 62 can be axially displaced together with the output ramp 62, in order to close the friction clutch 16, whereby the speeds of the input ramp 58 and the output ramp 62 are equalized. An offset of the output ramp 62 in the circumferential direction in relation to the input part 18 and the torque-introducing element 12 can be compensated by the restoring spring 64 designed as a leaf spring.

In the closed state of the friction clutch 16 that is shown in FIG. 1, a torque flow from the torque-introducing element 12 to the torque-discharging element 14 can take place in traction mode. It is additionally possible that a rotor of an electrical machine is attached to a radial outer surface 68 of the output part 20, and therefore the electrical machine can also introduce a torque in a boost mode.

Figure 2:
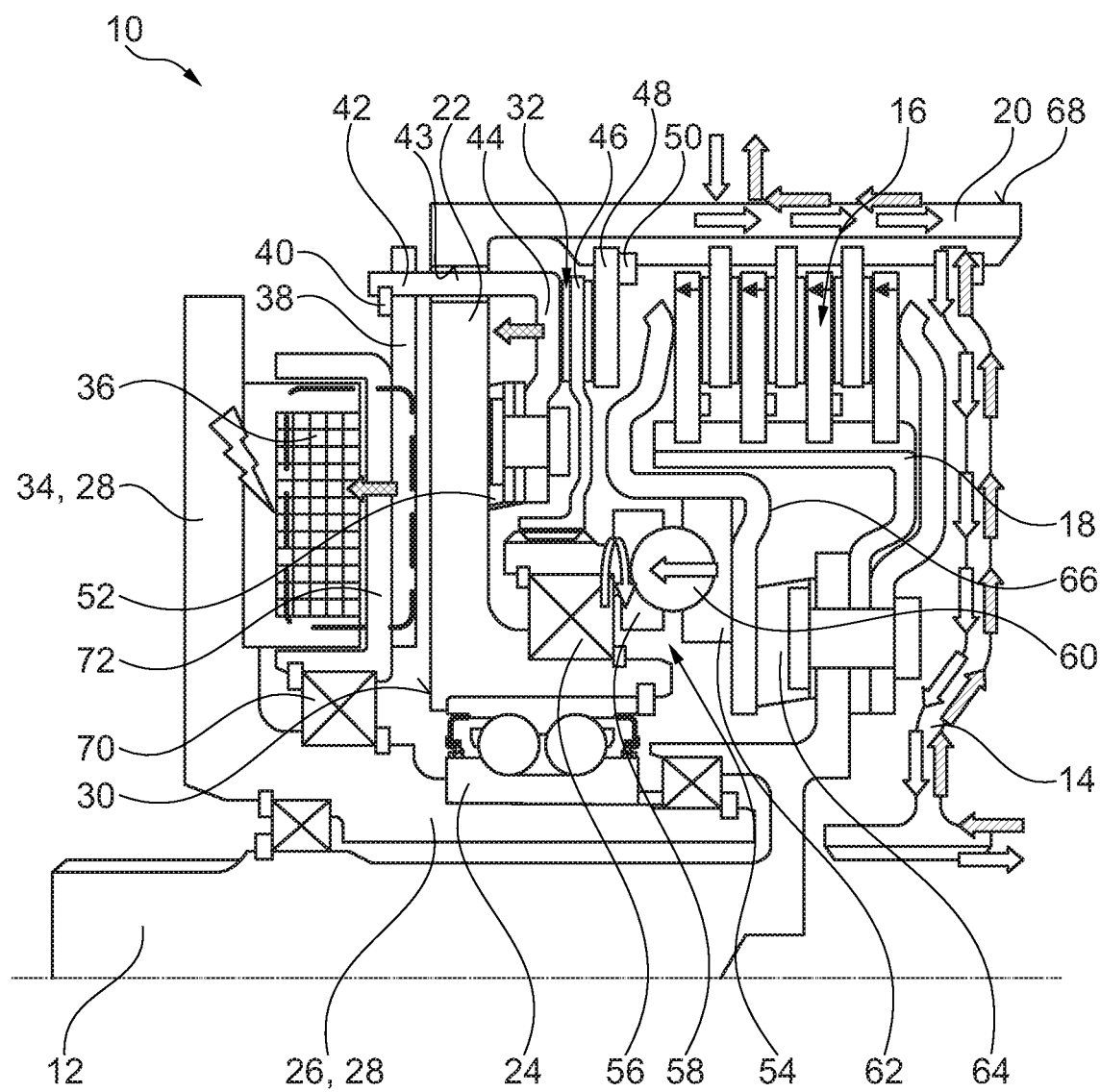
FIG. 2: shows a schematic sectional view of the clutch system from FIG. 1 in the open state.

In the open state of the friction clutch 16 that is shown in FIG. 2, the electromagnet 36 is energized and attracts the tie rod 38 to it. The tie rod 38 that is magnetically attracted by the electromagnet 36 and rotates at the speed of the output part 20 strikes against a contact plate 72 rotatably mounted on the module carrier 28 by means of a bearing 70, and therefore direct contact of the rotating tie rod 38 with the fixed electromagnet 36 is avoided. The contact plate 72 can rotate along with and at the speed of the tie rod 38. The magnetically displaced tie rod 38 is used to lift off the pressure element 44 against the spring force of the closing spring 52, and therefore the pilot clutch 32 opens. As a result, the input ramp 54 is no longer supported on the output part 20 of the friction clutch 16 by way of the clutch disk element 46 and the pilot clutch 32, with the result that the restoring spring 64 can press the ramp system 54 together, whereby the extent of the ramp system 54 is reduced. As a result, the pressure plate 66 is at the same time displaced axially into a position in which the friction clutch 16 is open and a torque transmission between the torque-introducing element 12 and the torque-discharging element 14 is interrupted. In this state of the clutch system 10, the electrical machine can drive the motor vehicle purely electrically in motor mode or can recover electrical energy from the powertrain in generator mode.

Figure 3:
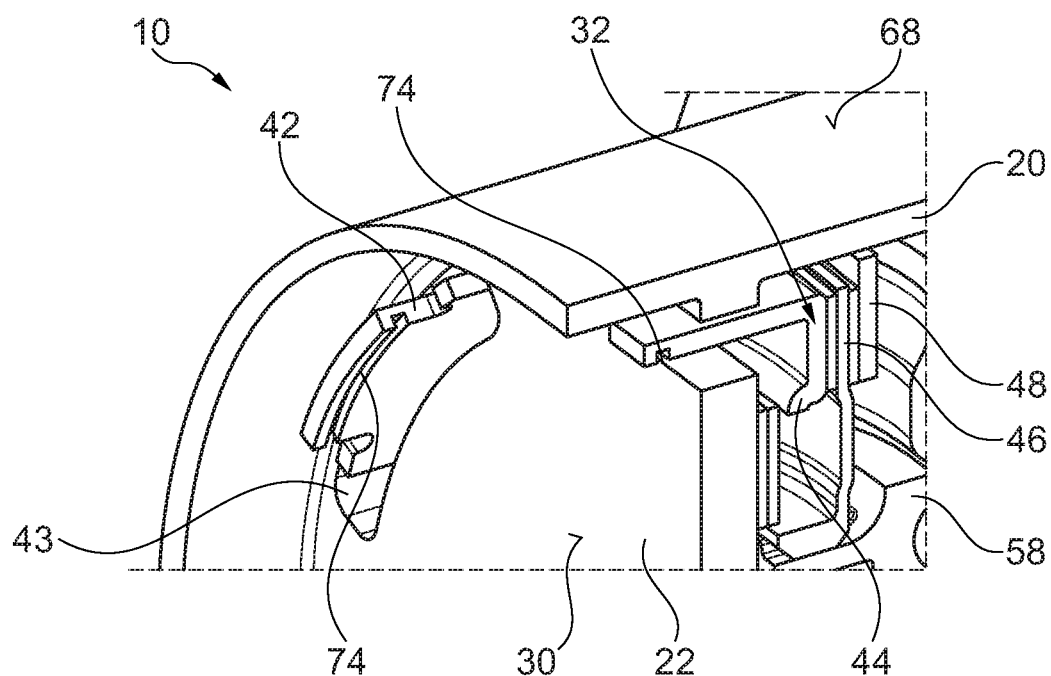
FIG. 3: shows a schematic perspective view of a detail of the clutch system from FIG. 1 without the tie rod
Figure 4:
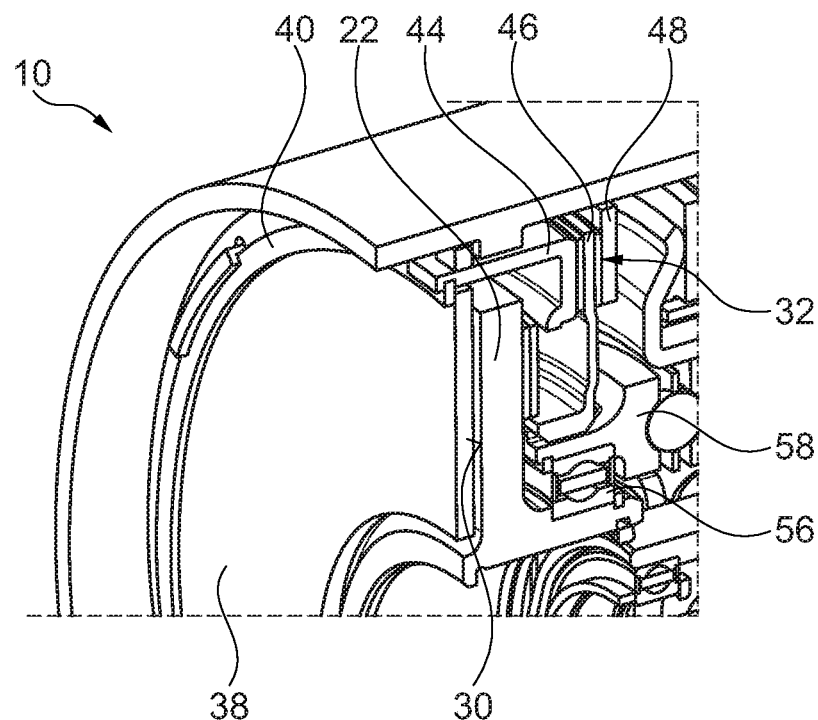
FIG. 4: shows a schematic perspective view of a detail of the clutch system from FIG. 3 with the tie rod.

As represented in FIG. 3, the fastening finger 42 can be inserted in the through-opening 43 of the supporting disk 38 with enough play in the circumferential direction. The fastening finger 42 may have a radially inwardly open retaining groove 74. As represented in FIG. 4, the circlip 40 can be inserted in the retaining groove 74, and therefore the tie rod 38 is captively held between the circlip 40 and the outer side 30 of the supporting disk 38 in the axial direction. When the electromagnet 36 magnetically attracts the tie rod 38, the tie rod 38 can strike against the circlip 40 and thereby take the fastening finger 42 along with it, in order to open the pilot clutch 32.

LIST OF REFERENCE DESIGNATIONS

10 Clutch system
12 Torque-introducing element
14 Torque-discharging element
16 Friction clutch
18 Input part
20 Output part
22 Supporting disk
24 Grooved ball bearing
26 Tube part
28 Module carrier
30 Outer side
32 Pilot clutch
34 Disk part
36 Electromagnet
38 Tie rod
40 Circlip
42 Fastening finger
43 Through-opening
44 Pressure element
46 Clutch disk element 48 Counter element
50 Blocking element
52 Closing spring
54 Ramp system
56 Supporting bearing
58 Input ramp
60 Ball
62 Output ramp
64 Restoring spring

The invention claimed is:

1. A clutch system for coupling a drive shaft of a motor vehicle engine to a transmission input shaft of a motor vehicle transmission, comprising:
   a friction clutch for transmitting a torque between a torque-introducing element and a torque-discharging element,
   a ramp system for an axial displacement of a pressure plate of the friction clutch, wherein the ramp system has an input ramp and an output ramp, which can be turned in relation to the input ramp to change an axial extent of the ramp system,
   a pilot clutch for actuating the ramp system based on a differential speed between the torque-introducing element and the torque-discharging element,
   an electromagnet for a magnetic actuation of the pilot clutch,
   wherein the pilot clutch is arranged between the friction clutch and the electromagnet in an axial direction and the ramp system is arranged radially on an inside thereof in relation to at least one of the pilot clutch and the friction clutch,
   a supporting disk arranged to support the friction clutch, and
   a fixed module carrier arranged to hold the electromagnet, wherein the supporting disk is mounted on the module carrier.

2. The clutch system as claimed in claim 1, wherein
   the supporting disk has an axial outer side facing away from the friction clutch,
   a tie rod is coupled to the pilot clutch by way of a fastening finger extending through the supporting disk and
   the tie rod is arranged between the electromagnet and the axial outer side of the supporting disk.

3. The clutch system as claimed in claim 2, wherein:
   the module carrier has a disk part extending in a radial direction for a fastening of the electromagnet and an axially extending tube part for mounting of the supporting disk.

4. The clutch system as claimed in claim 2, wherein
   the supporting disk has a partly annular through-opening for passing the fastening finger through.

5. The clutch system as claimed in claim 2, wherein between the electromagnet and the tie rod in the axial direction is a contact plate, which is mounted and fixed in the axial direction, for axially striking against the tie rod when there is a magnetic force acting from the electromagnet on the tie rod.

6. The clutch system as claimed in claim 1, further comprising a closing spring designed as a leaf spring and configured for automatically closing the pilot clutch when the electromagnet is switched off, wherein the closing spring is fastened to an inner side of the supporting disk that is facing away from an outer side of the supporting disk.

7. The clutch system as claimed in claim 1, wherein the output ramp is coupled to the torque-introducing element and the input ramp can be coupled to the torque-discharging element by the pilot clutch, or the output ramp is coupled to the torque-discharging element and the input ramp can be coupled to the torque-introducing element by way of the pilot clutch.

8. The clutch system as claimed in claim 1, further comprising a restoring spring designed as a leaf spring and arranged for automatically opening the friction clutch, wherein the restoring spring acts on the ramp system.

9. The clutch system as claimed in claim 1, wherein a rotor of an electrical machine is connected to at least one of an output part of the friction clutch and the torque-discharging element.

10. A clutch system for coupling a drive shaft of a motor vehicle engine to a transmission input shaft of a motor vehicle transmission, comprising:
    a friction clutch configured to transmit a torque between a torque-introducing element and a torque-discharging element;
    a ramp system configured to axially displace a pressure plate of the friction clutch for opening and closing the friction clutch, wherein the ramp system includes an input ramp and an output ramp, the output ramp being movable in relation to the input ramp to change an axial extent of the ramp system;
    a pilot clutch configured to actuate the ramp system based on a differential speed between the torque-introducing element and the torque-discharging element;
    a tie rod coupled to the pilot clutch and configured to actuate the pilot clutch by axial displacement; and
    an electromagnet configured to axially displace the tie rod, wherein the pilot clutch is arranged between the friction clutch and the electromagnet in an axial direction, wherein a contact plate is disposed between the electromagnet and the tie rod in the axial direction.

11. The clutch system of claim 10, wherein, in a radial direction, the pilot clutch is not covered by the electromagnet or the friction clutch.

12. The clutch system of claim 10, wherein the friction clutch is mounted radially within the clutch system by a radially extending supporting disk, wherein the supporting disk has an axial outer side facing away from the friction clutch, and wherein the tie rod is coupled to the pilot clutch by a fastening finger extending through the supporting disk and the tie rod is arranged between the electromagnet and the outer side of the supporting disk.

13. The clutch system of claim 10, wherein the ramp system includes an input ramp and an output ramp, the output ramp being movable in relation to the input ramp to change an axial extent of the ramp system.

14. The clutch system of claim 13, wherein the input ramp rotates along with and at a speed of the output ramp when the pilot clutch is open, and when the pilot clutch is closed, a speed difference corresponding to the speed difference of the torque-introducing element in relation to the torque-discharging element occurs between the input ramp and the output ramp allowing the input ramp to turn in relation to the output ramp.

15. The clutch system of claim 13, wherein, in response to an increase in the axial extent of the ramp system, the pressure plate of the friction clutch is axially displaced together with the output ramp to close the friction clutch.

16. The clutch system of claim 10, wherein the contact plate is arranged and configured for axially striking against the tie rod in response to a magnetic force acting from the electromagnet on the tie rod.

* * * * *